3,082,223
2-METHYLENE-ANDROSTANES
Albert Bowers, John Edwards, and James C. Orr, Mexico City, Mexico, assignors, by mesne assignments, to Syntex Corporation, a corporation of Panama
No Drawing. Filed Aug. 22, 1961, Ser. No. 133,071
Claims priority, application Mexico May 19, 1961
11 Claims. (Cl. 260—397.5)

The present invention relates to certain new cyclopentanoperhydrophenanthrene derivatives and to a method for the preparation thereof. More specifically, it relates to the novel 2 - methylene-androstan-17β-ol, its 17α-alkyl, alkenyl or alkynyl substituted derivatives, the esters of the same as well as to the corresponding 19-nor compounds.

The novel compounds object of our invention are powerful anabolic agents having a minimum of androgenic activity, lower the cholesterol level in the blood, relieve premenstrual tension, exhibit anti-estrogenic and anti-gonadotrophic activity, and inhibit the activity of the pituitary gland. Surprisingly, 2-methylene-androstan-17β-ol is a powerful anabolic agent, even by oral administration; the 17α-alkenyl and alkynyl compounds exhibit certain progestational activity.

These compounds are represented by the following formula:

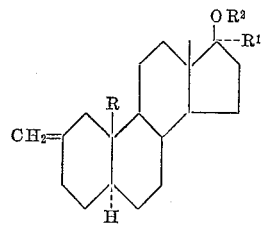

In the above formula R represents hydrogen or methyl, $R^1$ represents hydrogen or a lower alkyl group, i.e. an alkyl group of less than 8 carbon atoms such as methyl, ethyl, propyl, or butyl; a lower alkenyl group, i.e, an alkenyl group of 2 to 6 carbon atoms such as vinyl, propenyl(1) or butenyl(1), or a lower alkynyl group such as ethynyl, propynyl or butynyl(1); $R^2$ represents hydrogen or a radical of a carboxylic acid of less than 12 carbon atoms, saturated or unsaturated, of straight, branched cyclic or mixed cyclic-aliphatic chain, substituted or not with other functional groups such as hydroxyl, alkoxy, amino, halogen or other groups. Typical such esters are the acetate, propionate, valerate, enanthate, undecenoate, benzoate, trimethylacetate, terbutylacetate, phenoxyacetate, cyclopentylpropionate, aminoacetate and β-chloropionate.

The novel compounds object of our invention are obtained from the esters of Δ²-androsten-17β-ol and of Δ²-19-nor-androsten-17β-ol.

In copending patent application Serial No. 128,361, filed on August 1, 1961, there is described the preparation of Δ²-androsten-17β-ol and Δ²-19-nor-androsten-17β-ol, as well as of the esters of such compounds, starting from dihydroallotestosterone or one of its esters, or from 19-nor-dihydroallotestosterone and also from its esters, which upon treatment with one molar equivalent of bromine in acetic acid produce the 2α-bromo compounds; these derivatives are then reduced with a double metal hydride to obtain a mixture of 2α-bromo-3α and 3β-hydroxy isomers, with simultaneous hydrolysis of the acyloxy group at C-17.

By heating the mixture of epimeric bromohydrins with zinc dust in acetic acid there are obtained Δ²-androsten-17β-ol and 19-nor-Δ²-androsten-17β-ol.

The novel 2-methylene compounds object of our invention, which do not possess a substituent at C-17α are obtained by the method illustrated by the following series of reactions:

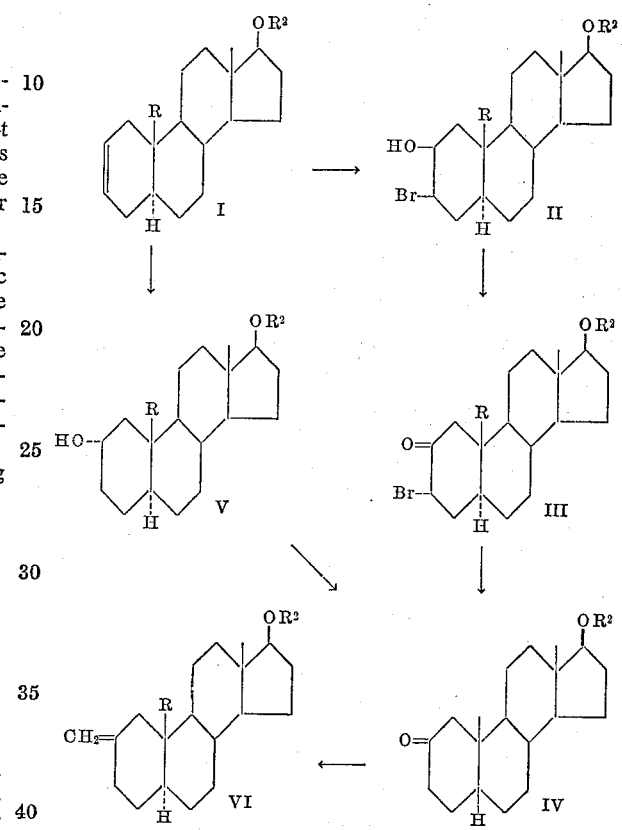

In the above formulas R and $R^2$ have the same meaning set forth previously.

The starting compound is an ester of Δ²-androsten-17β-ol, preferably the acetate (I; R=CH₃; R²=COCH₃) which upon treatment with N-bromoacetamide in dioxane and with perchloric acid, at room temperature for a period of time between 2 and 6 hours produces the corresponding bromohydrin (II; R=CH₃; R²=COCH₃). Alternatively, for this reaction there may be employed other reagents capable of generating hypobromous acid, such as the hypobromite of an alkali or alkali-earth metal or another N-bromoamide or N-bromoimide.

By oxidation of the above bromohydrin, preferably using chromic acid in acetic acid solution, at a temperature between 70 and 90° C., there is produced the acetate of androstan-17β-ol-2-one (IV; R=CH₃; R²=COCH₃).

Alternatively, the acetate of androstan - 17β-ol-2-one may be obtained by reacting the acetate of Δ²-androsten-17β-ol (I; R=CH₃; R²=COCH₃) with diborane, preferably using tetrahydrofurane as solvent in this reaction although it may also be conducted in other solvents inert to this reaction, such as diglyme (dimethyl ether of ethylene glycol). By treating the complex formed with 30% hydrogen peroxide in alkaline medium and in tetrahydrofurane there is obtained the 17-acetate of androstane-2α, 17β-diol (V; R=CH₃; R²=COCH₃), which upon subsequent oxidation produces the acetate of androstan-17β-ol-2-one (IV; R=CH₃; R²=COCH₃).

The substitution of the keto group at C-2 by a methylene group is effected by reacting androstan-17β-ol-2-one or its esters with methylene-triphenylphosphorane (Wittig reaction). Methylene-triphenylphosphorane is prepared previously by reacting a methyltriphenylphosphonium halide, preferably bromide, chloride or iodine, with a lower alkyl-lithium such as butyl lithium or an aryl lithium such as phenyl lithium in ether solution, and the reaction with the steroid is preferably conducted by refluxing in tetrahydrofurane for a period of time between 6 and 12 hours.

During this reaction the ester is eliminated, thus affording 2-methylene-androstan-17β-ol (VI; R=CH₃; R²=hydrogen).

Optionally, the above compound may be re-esterified by treatment with the anhydride or chloride of a carboxylic acid of 1 to 12 carbon atoms, in pyridine or benzene solution.

The above method is equally applied to the 19-nor series of derivatives, using as starting compound an ester of 19-nor-Δ²-androsten-17β-ol, preferably the acetate (I; R=H, R²=COCH₃). By reaction with N-bromoacetamide there is obtained the 17-acetate of 3α-bromo-19-nor-androstane-2β,17β-diol and further oxidation produces the acetate of 3α-bromo-19-nor-androstan-17β-ol-2-one; removal of the halogen by zinc treatment affords the acetate of 19-nor-androstan-17β-ol-2-one (IV; R=H; R²=COCH₃), which by means of the Wittig reaction produces 2-methylene-19-nor-androstan-17β-ol, which may be optionally re-esterified as already indicated.

There may equally be employed the reaction with diborane to obtain the 17-acetate of 19-nor-androstane-2α,17β-diol (V; R=H; R²=COCH₃), which on further oxidation affords the acetate of 19-nor-androstan-17β-ol-2-one.

The novel 17α-alkyl, alkenyl and alkynyl substituted derivatives of 2-methylene-androstan-17β-ol and their esters, as well as the croresponding 19-nor compounds, are prepared by the method illustrated by the following equation:

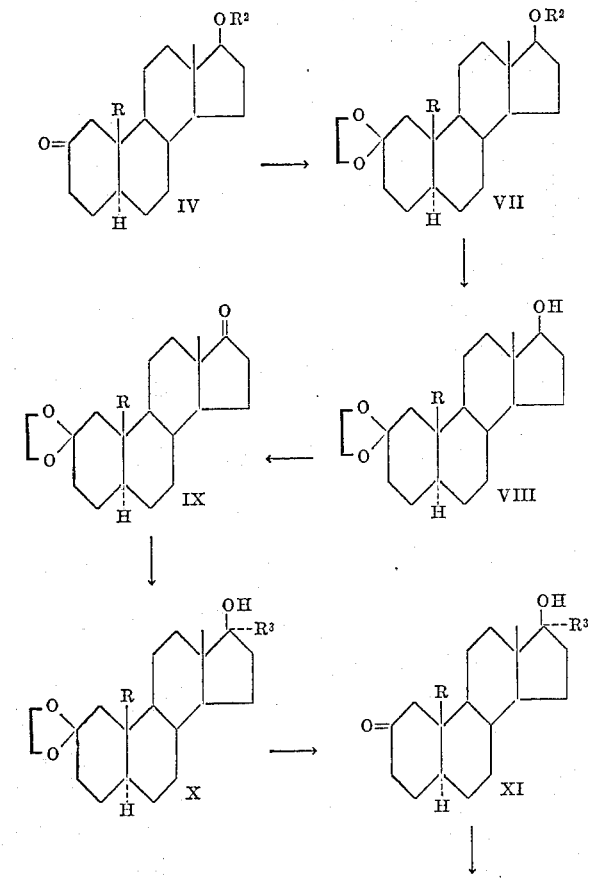

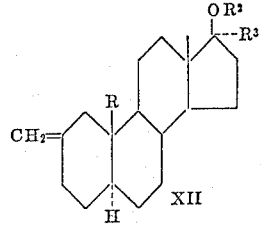

In the above formulas R and R² have the same meaning set forth previously, and R³ represents a lower alkyl, alkenyl or alkynyl group.

For introducing a hydrocarbon chain at C-17α it is necessary to protect the keto group at the C-2 position. The starting compound androstan-17β-ol-2-one or any of its esters, preferably the acetate (IV; R=Me, R²=COCH₃)

is converted into its corresponding ketal (VII) by reaction with ethylene glycol in benzene solution and in the presence of p-tolenesulfonic acid.

When an ester of androstan-17β-ol-2-one is employed as the starting compound, it is necessary to saponify the aciloxy group at C-17 after the formation of the ketal thus forming compound VIII.

By oxidizing the above compound (VIII) there is obtained 2-ethylenedioxy-androstan-17-one (IX), which by reaction with an alkyl, alkenyl or alkynyl magnesium halide such as methyl, ethyl, propyl, vinyl, ethynyl, or propargyl magnesium bromide, using for this purpose an aromatic hydrocarbon as solvent, such as benzene, toluene or xylene, or any other organic solvent inert to this reaction such as ether or tetrahydrofurane, either refluxing the mixture between 3 and 18 hours or keeping it at room temperature for 15 to 24 hours, under anhydrous conditions, there is produced the corresponding 17α-alkyl, alkenyl or alkynyl derivatives of 2-ethylenedioxy-androstan-17β-ol (X; R=methyl, R³=alkyl, alkenyl, alkynyl).

Alternatively, the 17α-alkynyl substituted compounds may be obtained by treating a benzene solution of 2-ethylenedioxy-androstan-17-one (IX) with sodium or potassium acetylide or with the sodium or potassium salt of another alkine. By partial hydrogenation of the 17α-alkynyl-2-ethylenedioxy-androstan-17β-ol derivatives, in the presence of a palladium catalyst, such as palladium on calcium carbonate, and using an amine as solvent, preferably pyridine, there are obtained the corresponding 17α-alkenyl derivatives, which, if desired, may be converted into the 17α-alkyl compounds.

By strong acid hydrolysis of the above 2-ethylenedioxy compounds (X; R=methyl), preferably employing 80% acetic acid in the hot, or p-toluenesulfonic acid in acetone, or hydrochloric acid in acetic acid at room temperature, there is regenerated the keto group at C-2, thus obtaining the 2-keto-17α-alkyl (alkenyl and alkynyl substituted androstanes (XI; R=methyl, R³=alkyl, alkenyl, alkynyl).

Optionally, these 17α-substituted compounds may be converted into the respective esters by treatment with an anhydride or chloride of a carboxylic acid of 1 to 12 carbon atoms, in benzene solution and in the presence of p-toluenesulfonic acid.

Finally, the methyl group at the position C-2 is introduced by means of the Wittig reaction as indicated previously, thus producing the 17α-alkyl, alkenyl or alkynyl substituted derivatives of 2-methyl-androstan-17β-ol and their respective esters (XII).

By applying the above method to 19-nor-androstan-17β-ol-2-one or any of its esters, preferably the acetate, there is obtained the acetate of 2-ethylenedioxy-19-nor-androstan-17β-ol (VII; R=H, R²=COCH₃); saponification of this compound followed by oxidation produces 2- ethylenedioxy-19-nor-androstan-17-one (IX; R=H); the introduction of a hydrocarbon at C–17 produces the 17α-alkyl, alkenyl or alkynyl substituted derivatives of 2-ethylenedioxy-19-nor-androstan-17β-ol (X; R=H); hydrolysis of the ketal and reaction with methylenetriphenylphosphorane of the above compounds gave the 17α-alkyl, 17α-alkenyl and 17α-alkynyl substituted derivatives of 2-methylene-19-nor-androstan-17β-ol and their respective esters (XII; R=H).

The following specific examples serve to illustrate but are not intended to limit the scope of the present invention:

Example I

To a solution of 2 g. of the acetate of Δ²-androsten-17β-ol in 50 ml. of dioxane and 0.5 ml. of a 1 N solution of perchloric acid was added in four portions 0.96 g. of N-bromoacetamide over a period of 40 minutes. The mixture was stirred at room temperature for 2 hours, then treated with an excess of 1% sodium bisulfite solution to destroy the excess of N-bromoacetamide and diluted with water; the organic product was extracted with methylene chloride and the organic layer was washed with water, dried over anhydrous sodium sulfate and evaporated under vacuum at 30° C. The residue was finally crystallized from ether, thus giving the 17-acetate of 3α-bromoandrostane-2β,17β-diol.

A cooled solution of 900 mg. of chromic anhydride in 20 ml. of dry pyridine was added to a solution of 1.0 g. of the above bromohydrin, over a period of 15 minutes, maintaining the temperature between 0–5° C.

The mixture was kept overnight at room temperature, poured into water and extracted with methylene chloride.

The organic layer was washed several times with water, dried over anhydrous sodium sulfate and the solvent was evaporated under reduced pressure. Crystallization of the residue from methylene chloride-hexane yielded the acetate of 3α-bromo-androstan-17β-ol-2-one.

To 2.0 g. of the above bromo-ketone in 50 ml. of acetic acid was added 2 g. of zinc dust and the mixture was heated at 90° C. for 1 hour under stirring. The zinc was removed by filtration and the filtrate was diluted with water until complete precipitation. The precipitated organic solid was collected by filtration, washed with water to neutral, dried and recrystallized from acetone-hexane, thus affording the acetate of androstan-17β-ol-2-one.

Example II

To a solution of 1 g. of 17-acetate of Δ²-androsten-17β-ol in 100 ml. of tetrahydrofurane was introduced a slow stream of diborane for 15 minutes at 10° C. After 1 hour the excess of diborane was destroyed by the cautious addition of water and then diluted with water to 500 ml. The precipitate of the organo-boro compound was collected and dried.

This material was dissolved in 100 ml. of tetrahydrofurane, cooled to 0–5° C. and treated with a solution of 1.8 g. of sodium hydroxide in 5 ml. of water. The mixture was then treated with 9 ml. of 30% hydrogen peroxide and stirred for 2 hours at room temperature.

The product which precipitated was collected, washed with water to neutral and dried, thus giving a mixture of isomers which was dissolved in benzene-hexane (70:30) and chromatographed in a column of 200 g. of washed alumina. The fractions eluted with benzene-ether (70:30) afforded the acetate of androstane-3α,17β-diol.

In the subsequent fractions of ether (100%) and ether-methylene chloride (30:70) there was obtained the 17-acetate of androstane-2α,17β-diol, which was crystallized from acetone-hexane.

In accordance with the method described in Example I, 600 mg. of the 17-acetate of androstane-2α,17β-diol was oxidized with chromic anhydride in pyridine to obtain finally the acetate of androstan-17β-ol-2-one.

Example III

A suspension of 18 g. of methyltriphenylphosphonium bromide in 200 ml. of ether was treated with 49 ml. of a 1.0 N ether solution of butyl-lithium, under an atmosphere of nitrogen.

After half an hour under stirring there was added dropwise a solution of 3 g. of the acetate of androstan-17β-ol-2-one in 200 ml. of ether and the resulting solution was stirred for 8 hours more.

The ether was removed by distillation and substituted by 400 ml. of tetrahydrofurane and the mixture was then refluxed for 8 hours.

Water was added to the cooled mixture and the product was extracted with methylene chloride. The organic extracts were combined, washed with much water, dried over anhydrous sodium sulfate and evaporated to dryness under reduced pressure.

The oily residue was dissolved in hexane-benzene (1:1) and chromatographed on neutral alumina.

Elution with benzene-hexane (2:1) and with pure benzene afforded 2-methylene-androstan-17β-ol, which was purified by crystallization from ether-pentane, thus giving 0.7 g. of 2-methylene-androstan-17β-ol.

A solution of 1 g. of 2-methylene-androstan-17β-ol in 5 ml. of pyridine and 2 ml. of acetic anhydride was kept overnight at room temperature and then poured into water; the precipitate formed was collected, washed with water to neutral and dried, thus obtaining the acetate of 2-methylene-androstan-17β-ol, which was recrystallized from acetone-hexane.

By the method of esterification described above, but using propionic, valeric, caproic, undecenoic and cyclopentylpropionic anhydrides as esterifying agents there were obtained the propionate, valerate, caproate, undecenoate and cyclopentylpropionate of 2-methylene-androstan-17β-ol.

Example IV

By following the method of Example I, but using as starting compound the acetate of 19-nor-Δ²-androsten-17β-ol, by the reaction with N-bromoacetamide there was obtained the 17-acetate of 3α-bromo-19-nor-androstane-2β,17β-diol, which on oxidation produced the acetate of 3α-bromo-19-nor-androstan-17β-ol-2-one.

Removal of the 3α-bromine atom by heating with zinc dust in acetic acid produced the acetate of 19-nor-androstan-17β-ol-2-one.

By applying the Wittig reaction described in Example III there was obtained 2-methylene-19-nor-androstan-17β-ol.

A solution of 500 mg. of 2-methylene-19-nor-androstan-17β-ol in 30 ml. of pyridine was treated with 2.0 ml. of benzoyl chloride and the mixture was kept for 24 hours at room temperature. After pouring into water the precipitate formed was collected by filtration, washed with water to neutral, dried and crystallized from methylene chloride-hexane, thus yielding the benzoate of 2-methylene-19-nor-androstan-17β-ol.

By using the above method, but employing as esterifying agents acetyl, propionyl and cyclopentylpropionyl chlorides, there were respectively obtained the acetate, propionate and cyclopentylpropionate of 2-methylene-19-nor-androstan-17β-ol.

Example V 5 g. of the acetate of androstan-17β-ol-2-one was dissolved in 300 ml. of anhydrous benzene free of thiophene and 40 ml. of ethylene glycol. There was then added 400 mg. of p-toluenesulfonic acid monohydrate and the mixture was refluxed for 16 hours with the use of a water separator. The cooled solution was washed with concentrated sodium bicarbonate solution and finally with water to neutral, dried over anhydrous sodium sulfate and evaporated to dryness. The residue was crystallized from acetone-hexane, thus giving the acetate of 2-ethylenedioxy-androstan-17β-ol.

To a solution of 1 g. of the above ketal in 75 ml. of methanol was added 15 ml. of a 10% solution of sodium hydroxide in methanol-water and the mixture was refluxed for 1 hour, neutralized with acetic acid, concentrated to half of its volume and finally diluted with water.

The precipitate obtained was collected by filtration, washed with water to neutral, dried and recrystallized from acetone-hexane, thus furnishing 0.72 g. of 2-ethylenedioxy-androstan-17β-ol.

The above compound was oxidized by following the method described in Example I, using chromium trioxide in pyridine at low temperature (0–5° C.). There was thus obtained 2-ethylenedioxy-androstan-17-one.

To a solution of 5 g. of 2-ethylenedioxy-androstan-17-one in 250 ml. of anhydrous benzene free of thiophene was added 28 ml. of an ether solution of methyl magnesium bromide (4 N). The mixture was refluxed for 3 hours, cooled, cautiously treated with concentrated aqueous ammonium chloride solution and extracted several times with ethyl acetate. The organic extracts were combined, washed with much water, dried and the solvent was evaporated.

The residue was dissolved in a mixture of benzene and hexane (50:50) and chromatographed on 200 g. of washed alumina. The fractions eluted with benzene-ether (70:30) were combined, thus giving 17α-methyl-2-ethylenedioxy-androstan-17β-ol.

By following the method described above, but using ethyl magnesium bromide and propyl magnesium bromide instead of methyl magnesium bromide as alkylating agents, 2-ethylenedioxy-androstan-17-one was converted into 2-ethylenedioxy-17α-ethyl-androstan-17β-ol and 2-ethylenedioxy-17α-propyl-androstan-17β-ol, respectively.

*Example VI*

A solution of 1 g. of 17α-methyl-2-ethylenedioxy-androstan-17β-ol in 30 ml. of 80% acetic acid was heated on the steam bath for 2 hours.

After diluting with water the product was collected by filtration, washed to neutral, dried and crystallized from methanol, thus producing 460 mg. of 17α-methyl-androstan-17β-ol-2-one.

A mixture of 1 g. of the above compound, 40 ml. of acetic acid, 20 ml. of acetic anhydride and 500 mg. of p-toluenesulfonic acid was kept at room temperature for 24 hours, then poured into water and heated on the steam bath to hydrolyze the excess of reagent. The precipitate formed was extracted with ethyl acetate, washed with water to neutral, dried over anhydrous sodium sulfate and the solvent was evaporated. The oily residue was dissolved in 50 ml. of ethanol, treated with 10 ml. of 0.5% aqueous sodium hydroxide solution and the mixture was kept for 1 hour at a temperature between 0° C. and 5° C.; it was then neutralized with acetic acid and concentrated under vacuum to half of its original volume; water was added and the precipitate formed was collected, washed with water, dried and recrystallized from acetone-hexane, thus giving the acetate of 17α-methyl-androstan-17β-ol-2-one.

To 6 g. of methyltriphenylphosphonium bromide suspended in 75 ml. of ether was added under an atmosphere of nitrogen 20 ml. of a 1 N ether solution of butyl lithium; after stirring the mixture for ½ hour there was cautiously added a solution of 1 g. of the acetate of 17α-methyl-androstan-2-one in 100 ml. of anhydrous ether and the stirring was continued for 6 hours further at room temperature.

The ether was removed and substituted by 200 ml. of anhydrous tetrahydrofurane; the mixture then refluxed for 8 hours, poured into water and extracted with methylene chloride: the organic layer was washed with water, dried over anhydrous sodium sulfate and evaporated to dryness.

The residue was chromatographed on neutral alumina (50 g.), and the fractions eluted with benzene-ether (70:30) and benzene-ether (50:50) afforded the acetate of 2-methylene-17α-methyl-androstan-17β-ol.

*Example VII*

By following the method of Example V, 6 g. of the acetate of 19-nor-androstan-17-β-ol-2-one dissolved in 400 ml. of benzene and 45 ml. of ethylene glycol was treated with 600 mg. of p-toluenesulfonic acid and refluxed for 16 hours, thus affording the acetate of 2-ethylenedioxy-19-nor-androstan-17β-ol.

By saponification of the above compound with 10% methanolic sodium hydroxide there was obtained 2-ethylenedioxy-19-nor-androstan-17β-ol, which on oxidation with chromium trioxide in pyridine produced 2-ethylenedioxy-19-nor-androstan-17-one.

A solution of 4 g. of the above ketone in 250 ml. of anhydrous benzene free of thiophene was treated with 30 ml. of a 4.0 N solution of methyl magnesium bromide in ether and the mixture was refluxed for 3 hours; concentrated aqueous ammonium chloride solution was cautiously added and the product was extracted with ethyl acetate; the organic extract was washed with water, dried over anhydrous sodium sulfate and evaporated to dryness under vacuum. The residue was chromatographed on washed alumina, thus affording 17α-methyl-2-ethylenedioxy-19-nor-androstan-17β-ol.

The ketal group of the above product was removed by heating with 80% acetic acid to produce 17-methyl-19-nor-androstan-17β-ol-2-one.

By following the method of Example III, a suspension of 8 g. of methyltriphenylphosphonium bromide in 100 ml. of anhydrous ether was treated under an atmosphere of nitrogen with 25 ml. of a 1 N ether solution of butyl lithium.

To the above mixture there was cautiously added a solution of 1.6 g. of 17α-methyl-19-nor-androstan-17β-ol-2-one in 150 ml. of anhydrous ether and the reaction mixture was stirred for 6 hours. The solvent was removed, substituted with 250 ml. of anhydrous tetrahydrofurane, refluxed for 8 hours, poured into water and extracted with methylene chloride; the combined organic extract was washed with water, dried over anhydrous sodium sulfate and the solvent was evaporated under reduced pressure.

The residue was dissolved in benzene-hexane (50:50) and chromatographed on 75 g. of neutral alumina.

The crystalline fractions eluted with benzene-ether (50:50) produced 2-methylene-17α-methyl-19-nor-androstan-17β-ol.

*Example VIII*

A solution of 5 g. of 2-ethylenedioxy-androstan-17-one in 100 ml. of anhydrous ether was added dropwise to a cold (5° C.) solution of propargylmagnesium bromide (prepared from 6.8 g. of propargyl bromide, 1.4 g. of magnesium and 200 ml. of anhydrous ether) and the mixture was refluxed overnight with stirring. After cooling it was poured into 500 ml. of 5% ammonium chloride solution, the ether layer was separated, washed with water to neutral, dried over anhydrous sodium sulfate and evaporated to dryness under vacuum. Crystallization of the residue from acetone-ether afforded 3.8 g. of 17α-propargyl-2-ethylenedioxy-androstan-17β-ol. A mixture of 3 g. of the above product and 100 ml. of 80% acetic acid was heated on the steam bath for 2 hours. Water was added until complete precipitation of the product which was collected, washed with water, dried and crystallized from acetone-ether, thus furnishing 17α-propargyl-androstan-17β-ol-2-one.

The above product was esterified with propionic anhydride in benzene solution and in the presence of p-toluenesulfonic acid, followed by alkaline treatment, in accordance with the method described in Example VI, to form the propionate of 17α-propargyl-androstan-17β-ol-2-one.

The above propionate was treated under reflux in anhydrous tetrahydrofurane with methylenetriphenylphosphorane (Wittig reaction) to produce finally the propionate of 2-methylene-17α-propargyl-androstan-17β-ol.

Example IX

A solution of 2 g. of 2-ethylenedioxy-androstan-17-one in 60 ml. of anhydrous benzene was added under an atmosphere of nitrogen to a solution of potassium ter-amylate previously prepared from 1.4 g. of potassium and 30 ml. of anhydrous ter-amyl alcohol. Into the resulting mixture there was introduced a slow stream of purified acetylene for 40 hours and the mixture was then poured into ice water and extracted several times with benzene. The combined extract was washed to neutral, the organic layer was dried over anhydrous sodium sulfate and evaporated to dryness under vacuum.

The residue was chromatographed on 50 times its weight of washed alumina and the fractions eluted with benzene-ether (70:30 and 50:50) were combined and recrystallized from acetone-ether, thus furnishing 1.6 g. of 17α-ethynyl-2-ethylenedioxy-androstan-17β-ol.

A solution of 2.5 g. of 17α-ethynyl-2-ethylenedioxy-androstan-17β-ol in 75 ml. of 80% acetic acid was heated on the steam bath for 2 hours and the mixture was then poured into water; the product which precipitated was collected, washed to neutral, dried and recrystallized from methylene chloride-ether, thus producing 17α-ethynyl-androstan-17β-ol-2-one.

A mixture of 1 g. of the above compound, 50 ml. of benzene, 25 ml. of caproic anhydride and 500 mg. of p-toluenesulfonic acid was kept at room temperature for 24 hours, then diluted with water and the benzene layer was separated, consecutively washed with 5% aqueous sodium carbonate solution and water, dried over anhydrous sodium sulfate and evaporated to dryness under reduced pressure; the product obtained was treated with 0.5% aqueous sodium hydroxide solution, by following the method described in Example VI. Chromatography of the residue followed by crystallization of the solid fractions from acetone-hexane afforded the caproate of 17α-ethynyl-androstan-17β-ol-2-one.

2 g. of the above product was treated with methylenetriphenylphosphorane, in accordance with the method described in Example III, to produce the caproate of 2-methylene-17α-ethynyl-androstan-17β-ol.

Example X

In the method of the preceding example there was substituted the 2-ethylenedioxy-androstan-17-one by 2-ethylenedioxy-19-nor-androstan-17-one, thus obtaining successively 17α-ethynyl-2-ethylenedioxy-19-nor-androstan-17β-ol and 17α-ethynyl-19-nor-androstan-17β-ol-2-one; the latter was esterified with butyric anhydride in benzene solution and in the presence of p-toluenesulfonic acid, in accordance with the method of the preceding example, to produce the butyrate of 17α-ethynyl-19-nor-androstan-17β-ol-2-one. By means of the Wittig reaction this compound produced the butyrate of 2-methylene-17α-ethynyl-19-nor-androstan-17β-ol.

Example XI

A suspension of 500 mg. of 2% palladium on calcium carbonate in 20 ml. of anhydrous dioxane was hydrogenated for 2 hours. To this prehydrogenated mixture was added a solution of 2 g. of 17α-ethynyl-2-ethylenedioxy-androstan-17β-ol (obtained in Example IX) in 80 ml. of dioxane and the hydrogenation was continued at ordinary pressure; after 45 minutes there had been absorbed the equivalent of 1 mol of hydrogen and then the catalyst was removed by filtration, the filtrate was evaporated to dryness under reduced pressure and the residue was dissolved in ethyl acetate; the solution was washed with water, dried over anhydrous sodium sulfate and concentrated to a small volume under vacuum. Crystallization from ethyl acetate-ether afforded 17α-vinyl-2-ethylenedioxy-androstan-17β-ol.

Treatment of the above product with 80% acetic acid for 2 hours on the steam bath produced 17α-vinyl-androstan-17β-ol-2-one; by esterification with acetic anhydride and p-toluenesulfonic acid at room temperature for 24 hours, followed by alkaline treatment, there was obtained the acetate of 17α-vinyl-androstan-17β-ol-2-one, which by the Wittig reaction with methylenetriphenylphosphorane described in the preceding examples, produced the acetate of 2-methylene-17α-vinyl-androstan-17β-ol.

Example XII

By following the method of the preceding example, but substituting the 17α-ethynyl-2-ethylenedioxy-androstan-17β-ol by its 19-nor derivative there was first obtained by catalytic hydrogenation 17α-vinyl-2-ethylenedioxy-19-nor-androstan-17β-ol. Successively, hydrolysis of the ketal produced 17α-vinyl-19-nor-androstan-17β-ol-2-one and acetylation and Wittig reaction with methylenetriphenylphosphorane gave the acetate of 2-methylene-17α-vinyl-19-nor-androstan-17β-ol.

Example XIII

By applying the method of Example VI to 2-ethylenedioxy-17α-ethyl-androstan-17β-ol and 2-ethylenedioxy-17α-propyl-androstan-17β-ol produced in Example V, there were obtained correspondingly the acetate of 2-methylene-17α-ethyl-androstan-17β-ol and of 2-methylene-17α-propyl-androstan-17β-ol.

Example XIV

By applying the method of Example III to 17α-methyl-androstan-17β-ol-2-one, 17α-vinyl-androstan-17β-ol-2-one and 17α-ethynyl-androstan-17β-ol-2-one, there were correspondingly obtained 2-methylene-17α-methyl-androstan-17β-ol, 2-methylene-17α-vinyl-androstan-17β-ol and 2-methylene-17α-ethynyl-androstan-17β-ol.

We claim:
1. A compound of the following formula:

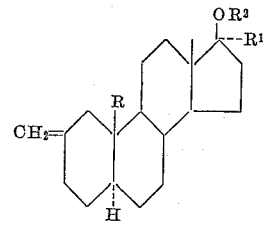

wherein R is selected from the group consisting of hydrogen and methyl; R¹ is selected from the group consisting of hydrogen, lower alkyl, lower alkenyl and lower alkynyl and R² is selected from the group consisting of hydrogen and a hydrocarbon carboxylic acyl group of less than 12 carbon atoms.

2. 2-methylene-androstan-17β-ol.
3. 2-methylene-19-nor-androstan-17β-ol.
4. 2-methylene-17α-methyl-androstan-17β-ol.
5. 2-methylene-17α-methyl-19-nor-androstan-17β-ol.
6. 2-methylene-17α-vinyl-androstan-17β-ol.
7. 2-methylene-17α-ethynyl-androstan-17β-ol.
8. The propionate of 2-methylene-17α-propargyl-androstan-17β-ol.
9. The acetate of 2-methylene-17α-vinyl-19-nor-androstan-17β-ol.
10. The caproate of 2-methylene-17α-ethynyl-androstan-17β-ol.
11. The butyrate of 2-methylene-17α-ethynyl-19-nor-androstan-17β-ol.

References Cited in the file of this patent
UNITED STATES PATENTS
2,985,669    Muller _____ May 23, 1961